United States Patent [19]

Tanaka

[11] 4,369,428
[45] Jan. 18, 1983

[54] PARKING BRAKE WARNING SYSTEM

[75] Inventor: Toshiyuki Tanaka, Fuji, Japan

[73] Assignee: Nissan Motor Co., Ltd., Yokohama, Japan

[21] Appl. No.: 263,746

[22] Filed: May 14, 1981

[30] Foreign Application Priority Data

May 22, 1980 [JP] Japan .............................. 55-70524[U]

[51] Int. Cl.³ .............................................. B60Q 1/48
[52] U.S. Cl. ....................................... 340/69; 340/71; 340/93; 340/95
[58] Field of Search ..................... 340/66, 69, 71, 72, 340/81 R, 81 F, 87, 93, 95

[56] References Cited

U.S. PATENT DOCUMENTS 3,052,870 9/1962 Pieper ................................. 340/69

Primary Examiner—Alvin H. Waring
Attorney, Agent, or Firm—Lane, Aitken, Kice & Kananen

[57] ABSTRACT

In order to indicate the operation of a parking brake of an automobile, a switching means responsive to the operation of the parking brake is disposed between the ignition switch and a power side terminal of the stop lights for indicating the braking of the automobile. The operation of the parking brake is thus indicated to the drivers of automobiles coming from behind, thereby preventing a collision from behind or the other accidents.

2 Claims, 4 Drawing Figures

FIG. IA PRIOR ART
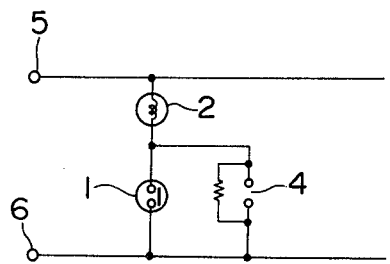
FIG. IB PRIOR ART
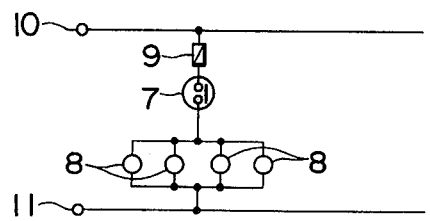
FIG. 2
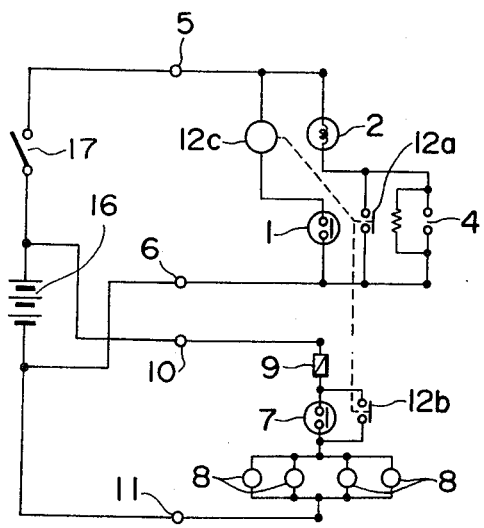
FIG. 3
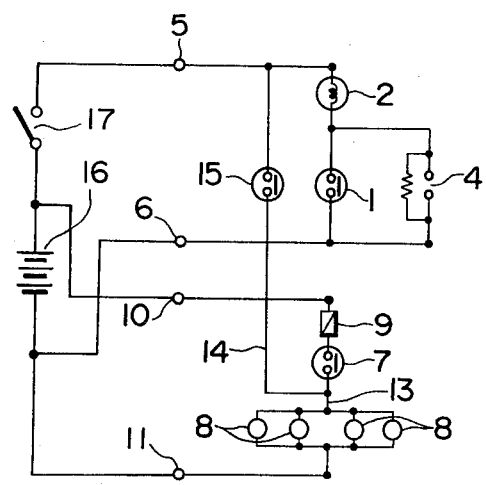

PARKING BRAKE WARNING SYSTEM

BACKGROUND OF THE INVENTION

1. Field of the Invention

The present invention relates to a parking brake warning system of an automobile which is capable of indicating an operational state of the parking brake to the drivers of the other automobiles coming from behind.

2. Description of the Prior Art

In the case of the conventional automotive parking brake warning system, the operational state of the parking brake is only indicated to a driver of the automobile by means of a brake warning lamp disposed in an instrument board of the automobile. Therefore, such a system is not capable of indicating the operation of the parking brake to the drivers of the automobiles coming from behind by using the stop light which indicates the operation of a service brake.

Consequently, there is a fear that the drivers of the automobiles approaching from behind do not recognize that the automobile is stopped for parking. And it may cause a collision from behind or a sudden braking for avoiding a collision, which are quite dangerous to the drivers or the passengers of both of the parked and succeeding automobiles.

SUMMARY OF THE INVENTION

According to the present invention, there is provided a parking brake warning system of an automobile having a service brake and a parking brake. The warning system features in a parking brake operation state a responsive switch arrangement whereby a stop light and a warning lamp are turned on upon actuation of the parking brake as long as an engine ignition switch is closed, but, when the ignition switch is opened, the stop light and the warning lamp are not on even if the parking brake is actuated, thus avoiding unnecessary consumption of the electric energy.

An object of the present invention is therefore to provide a parking brake warning system which is capable of indicating the operation of the parking brake to the drivers of automobiles approaching from behind by means of ordinary stop lights equipped to the automobiles.

BRIEF DESCRIPTION OF THE DRAWINGS

FIGS. 1A and 1B show a circuit diagram of a conventional parking brake circuit and a conventional service brake circuit respectively;

FIG. 2 is a circuit diagram of a first embodiment according to the present invention; and FIG. 3 is a circuit diagram of a second embodiment according to the present invention.

DETAILED DESCRIPTION OF THE PREFERRED EMBODIMENT

Before entering into the explanation of the embodiment according to the present invention, a conventional parking brake circuit and a service brake circuit are explained for the better understanding of the present invention.

Referring to FIGS. 1A and 1B, a conventional electric circuit of the automotive brake system is explained. FIG. 1A shows a circuit diagram of a parking brake circuit, in which a series circuit of a parking brake switch 1 and a warning lamp 2 is connected to a power source of the automobile via an ignition switch (not shown). In addition, a brake fluid level switch 4 is further connected in parallel with the parking brake switch 1.

When the ignition switch is turned on, a power voltage is applied to power supply terminals 5 and 6 of this parking brake circuit. In this state, if the parking brake is operated by a driver of the automobile, the parking brake switch 1 is turned on, causing a current to flow through the warning lamp 2, thereby indicating the operation of the parking brake to a driver of the automobile.

Similarly, when the amount of the brake fluid becomes insufficient, the brake fluid level switch 4 is closed to permit the driving current to flow through the warning lamp 2.

FIG. 1B shows a circuit diagram of the service brake circuit, in which a series circuit of a service brake switch 7 and a plurality of stop lights 8 connected in parallel with each other is connected to the power source of the automobile through a fuse 9, and the power voltage is continuously applied to terminals 10 and 11 of this service brake circuit irrespective of the state of the ignition switch.

The stop lights 8 are turned on when a driver of the automobile presses down a brake pedal in order to decelerate the automobile. Thus, the braking of the automobile is indicated to the drivers of automobiles coming from behind.

However, as previously mentioned, these conventional parking brake and service brake circuits are not capable of indicating the operation of the parking brake to the drivers of the automobiles approaching from behind.

A first embodiment according to the present invention is explained hereinafter with reference to FIG. 2.

As shown in FIG. 2, the first embodiment of the present invention comprises a parking brake switch 1 responsive to the operation of a parking brake of the automobile, a warning lamp 2 for indicating the operation of the parking brake of the automobile, a brake fluid level switch 4 for sensing the level of a brake fluid within a master cylinder of the service brake, a plurality of stop lights 8 for indicating the operation of the service brake, and a brake switch 7 disposed in series with the drive circuit of the stop lights 8. This warning system further comprises a relay 12 having a relay coil 12c connected in series to the parking brake switch 1 and normally open relay contacts 12a and 12b respectively connected to the driving circuits of the warning lamp 2 and the stop lights 8. The power supply terminals 5 and 6 are connected to an electric power supply source or battery 16 of the automobile via an ignition switch 17 and the power supply terminals 10 and 11 are connected directly to the electric power supply source 16.

By the above circuit construction, when the driver of the automobile operates a parking brake lever, while the ignition switch 17 is turned on, the relay coil 12a of the relay 12 is energized by the closure of the parking brake switch 1, and the relay contact 12a is closed. When the contact 12a is closed, the driving current of the warning lamp 2 flows from the electric power supply source 16 through the relay contact 12a of the relay 12, thereby indicating the operation of the parking brake. At the same time, by the energization of the relay coil 12c of the relay 12, the relay contact 12b is turned on, so that the stop lights 8 are supplied with a driving current from the power supply source 16 through the relay contact 12b, thereby indicating the operating condition of the parking brake.

When the lever of the parking brake is returned to the released position, the relay coil 12c of the relay 12 is immediately de-energized, so that each of the relay contacts 12a and 12b opens again. By the opening of relay switches 12a and 12b, both of the warning lamp 2 and the stop lights 8 are turned off at the same time.

If the ignition switch 17 is turned off when the lever of the parking brake is in an operated position to actuate the parking brake, both of the warning lamp 2 and the stop lights 8 are turned off due to the deenergization of the relay coil 12c of the relay 12, thus opening the relay contacts 12a and 12b. In this state, if the service brake is operated by the driver, the brake switch 7 is closed to turn on the stop lights 8.

A second embodiment according to the present invention is explained hereinafter with reference to FIG. 3.

As shown in FIG. 3, the basic circuit construction of this embodiment is substantially the same as the circuit construction of the conventional warning system circuit shown in FIGS. 1A and 1B. Therefore, an explanation of the equivalent or the corresponding circuit portions is omitted.

This embodiment features that an additional switch 15 responsive to the operation of the parking brake is further provided and the power supply side terminal of the stop lights 8 of the service brake circuit is connected to this switch 15 as well as to the brake switch 7. By this circuit construction, both of the warning lamp 2 and the stop lights 8 are connected to the ignition switch 17 via the switch 1 and the switch 15. If the driver of the automobile operates the lever of the parking brake when the ignition switch 17 is turned on, the driving current is fed to the warning lamp 2 and the stop lights 8 from the power supply source 16 through the power supply terminals 5 and 6 of this warning system, thereby turning on the warning lamp 2 and the stop lights 8 at the same time. Furthermore, when the ignition switch 17 is turned off, the voltage at the terminals 5 and 6 drops to zero and the warning lamp 2 and the stop lights 8 are turned off at the same time. On the other hand, the operation of the service brake switch 7 is the same as the conventional warning system; therefore, the stop lights 8 are also turned on upon operation of the service brake.

It will be readily appreciated from the foregoing, according to the present invention, if the parking brake is actuated when the automobile is being parked, the stop lights are turned on, as well as the warning lamp disposed within the instrument panel, as soon as the ignition switch is turned on. Thus, the operating state of the parking brake is indicated not only to the driver of the automobile, but also to the drivers of the other automobiles which are approaching from behind, thereby eliminating or reducing the possibility of collision from behind and the possibility of being involved in other accidents caused by the sudden braking.

Furthermore, with this warning system, there appears no fear that the warning lamp and the stop lights consume the electric energy of storage battery during long term parking. This is due to the fact that these loads are isolated from the power circuit of the automobile immediately after the ignition switch is turned off. Specifically, the relay coil 12c of the relay 12 or the switch 15 is supplied with the driving current through the ignition switch. Thus, the battery voltage is not consumed by the warning lamp or the stop light during long term parking.

Furthermore, according to the present invention, the warning system is easily constructed by employing several additional parts such as a relay or a switch for the stop light; thus, a concise and low cost warning system is provided.

What is claimed is:

1. A parking brake warning system of an automobile having a service brake and a parking brake, comprising:
   an electric power supply source;
   a warning lamp;
   first and second parking brake operation responsive switches which are cooperating with each other in such a manner that both of said parking brake operation responsive switches are opened or closed concurrently;
   an ignition switch;
   said warning lamp, said first parking brake operation responsive switch and said ignition switch being connected in series with respect to said electric power supply source;
   a stop light;
   a service brake operation responsive switch which is closed upon application of the service brake;
   said service brake operation responsive switch and said stop light being connected in series with respect to said electric power supply source, said service brake operation responsive switch and said ignition switch being connected in parallel with respect to said electric power supply source;
   said second parking brake responsive switch and said stop lamp being connected in series with respect to said electric power supply source, said second parking brake responsive switch and said ignition switch being parallel with respect to said electric power supply source;
   a third parking brake operation responsive switch which is closed upon actuation of the parking brake; and
   a relay coil;
   said third parking brake responsive switch, said relay coil and said ignition switch being connected in series with respect to said electric power supply source;
   said first and second parking brake operation responsive switches cooperating with said relay coil such that said first and second parking brake operation responsive switches are closed when said relay coil is energized.

2. A parking brake warning system of an automobile having a service brake and a parking brake, comprising:
   an electric power supply source;
   a warning lamp;
   first and second parking brake operation responsive switches which are cooperating with each other in such a manner that both of said parking brake operation responsive switches are opened or closed concurrently;
   an ignition switch;
   said warning lamp, said first parking brake operation responsive switch and said ignition switch being connected in series with respect to said electric power supply source;
   a stop light;
   a service brake operation responsive switch which is closed upon application of the service brake, said service brake operation responsive switch and said stop light being connected in series with respect to said electric power supply source, said service brake operation responsive switch and said ignition switch being in parallel with respect to said electric power supply source;

said second parking brake operation responsive switch, said ignition switch and said stop lamp being connected in series with respect to said electric power supply source;

said first and second parking brake operation responsive switches being closed concurrently upon actuation of the parking brake.

* * * * *